(12) United States Patent
Shemesh

(10) Patent No.: US 8,934,592 B2
(45) Date of Patent: Jan. 13, 2015

(54) METHOD FOR REDUCING DATA ALIGNMENT DELAYS

(71) Applicant: ECI Telecom Ltd., Petach Tikva (IL)

(72) Inventor: Ronen Shemesh, Hod Hasharon (IL)

(73) Assignee: ECI Telecom Ltd., Petach Tikva (IL)

( * ) Notice: Subject to any disclaimer, the term of this patent is extended or adjusted under 35 U.S.C. 154(b) by 30 days.

(21) Appl. No.: 13/749,296

(22) Filed: Jan. 24, 2013

(65) Prior Publication Data
US 2013/0188676 A1 Jul. 25, 2013

(30) Foreign Application Priority Data

Jan. 24, 2012 (IL) .......................................... 217699

(51) Int. Cl.
*H04L 7/00* (2006.01)
*H04L 25/14* (2006.01)

(52) U.S. Cl.
CPC .............. *H04L 7/0041* (2013.01); *H04L 25/14* (2013.01)
USPC ............ 375/354; 375/365; 375/368; 375/371

(58) Field of Classification Search
USPC ......................................... 375/354, 219, 267
See application file for complete search history.

(56) References Cited

U.S. PATENT DOCUMENTS

| 6,701,466 B1* | 3/2004 | Fiedler ........................... 714/699 |
| 2006/0136531 A1* | 6/2006 | Ng ................................. 708/100 |

* cited by examiner

*Primary Examiner* — Adolf Dsouza
(74) *Attorney, Agent, or Firm* — Browdy and Neimark, PLLC

(57) ABSTRACT

A method is provided for synchronizing binary data transmitted in parallel via N channels. The method comprises performing at the receiver side, a data-clock-alignment for the data in the N channels by selecting an optimal reference channel to which no delay will be added, and adding an appropriate delay to each of the remaining channels, until their respective centers of valid data portions are aligned to each other, and associating clock edges with the centers of the valid data portions. The method is characterized in that the alignment is performed regardless to whether binary word alignment is simultaneously achieved or not, and wherein the optimal reference channel allows aligning the centers of valid data of all the channels while adding a minimal delay to a worst channel from among the remaining channels, wherein the worst channel carries valid data portions which are maximally shifted from those of the reference channel.

6 Claims, 4 Drawing Sheets

METHOD FOR REDUCING DATA ALIGNMENT DELAYS

CROSS-REFERENCE TO RELATED APPLICATIONS

This application claims priority of Israel Patent Application No. 217699, filed Jan. 24, 2012, the disclosure of which is incorporated by reference herein in its entirety.

FIELD OF THE INVENTION

The present invention relates to the field of data communication, more particularly to methods of synchronizing data being transmitted in parallel via a number of communication paths (e.g. via a bus).

The problem addressed by this invention is applicable to various types of networks and data protocols.

BACKGROUND OF THE INVENTION

There is a known problem to synchronize a number of data flows when they are transmitted in parallel via a number of respective communication links/paths, being part of an interface or a bus. The problem is usually resolved by adding delays to align different data portions transmitted in parallel. However, the way it is usually performed in the prior art suffers from several drawbacks.

The task to be solved can be described with reference to FIG. 1 (prior art). An interface comprising a number of data paths/links conveys corresponding data flows from a transmitting side (TX) to a receiving side (RX). The receiving side (RX) of the interface (having more than one data path) should meet the following conditions in order to function properly:
1. Timing relationship between the sampling clock edge and the arriving data should meet conventional so-called setup and hold time requirements. In other words, the clock edge must be positioned within an arriving valid data portion (for example, within so-called data eye or eye pattern, in case of differential transmission) and not in a transition area between the valid data portions. The valid data, for example a valid data eye, can be understood as a time period during which one portion of digital information (for example, 1 or 0 of binary information) can be validly/stably detected by a corresponding detector at the receiver. Examples of valid data eyes are illustrated as white/light portions of FIG. 1. An open eye pattern corresponds to minimal signal distortion. Distortion of the signal waveform due to different types of interferences appears as closure of the eye pattern).
2. For designs that are sensitive to binary word alignment, i.e. the data arriving to the receiver on each of the data lines has to be data that was originated on the same clock edge at the transmitting side.

FIG. 1 is an example of data arriving at the receiver side via four data paths. The first line shows clock pulses at the receiver (RX clk), the vertical lines show clock edges and a clock cycle there-between.

This example demonstrates possible conditions where data in each channel (CH-0 . . . CH-3) arrives at the receiver with a different delay and different amount of eye distortion: the channels arrive with dissimilar valid eye size. As seen in this example, for some paths/channels, the clock sampling (at clock edges demonstrated by vertical lines) is not within a valid data eye (shown by bright portions of transmission). For some paths, the delay is even higher than a clock cycle, with respect to the other paths.

FIG. 2 (prior art) illustrates a better situation, wherein the sampling clock edge is brought to the valid data area. It does meet the timing requirement (requirement 1), but the clock may capture data carried along different data paths at different clock cycles (for example, the clock samples on ch-0 data transmitted on time t3 while for ch-1 it samples data that was transmitted on time t2).

Naturally the question to be asked is what can be done to synchronize data eyes and align the data bits?

Typical solutions are:
Data-clock-alignment: Positioning the sampling edge of the clock at the center of the valid data (data eye) by adding delay to the data paths/channels; the Data-clock-alignment is usually combined with:
Word Alignment: Ensuring that the data is arriving at the right clock edge. Many prior art solutions are known, some of them by XILINX® (Xilinx FPGAs has IO (input/output) components called ISERDES and IDELAY, where the IDELAY may add delays to the received data path and the ISERDES may perform bitslip for word alignment).

However, the problem remains that adding delay to data paths generally involves undesired jitter that, as a result, will narrow the valid portion of the data (such as data eye). This effect is more intrusive when higher data rates are required.

A number of solutions for data alignment have been developed by XILINX®. For example, XILINX proposed a design of 16 Channel, DDR LVDS Interface with real time windows monitoring. [Brandon Day, XAPP 860 (v.1.1) Jul. 17, 2008].

A so-called bit-align machine is designed to perform clock-data alignment on a data channel by dynamically varying the delay in the data path, until the optimal sampling point is found.

Xilinx FPGA characteristics derived from the document [Xilinx documentation: DS152 (v3.2) Apr. 1, 2011] provides us with a numeric example:

When looking at one channel of data, adding delay increment with a fixed amount of delay (~78 ps delay), will narrow the eye by 10 ps. (The eye may be narrowed even by 18 ps, when HIGH_PERFORMANCE mode is set to FALSE). If twenty delay increments are required for a specific channel, it will narrow the valid data eye of this channel by 20×10=200 ps. This might be unacceptable for an interface where the arriving data has already quite a narrow eye.

Reducing the necessary delay to its minimum value would optimize the interface to handle tougher timing conditions. (In some cases, reducing the delay is crucial in order to meet timing requirements at all).

US2006188050A and U.S. Pat. No. 5,652,767A deal with similar problems. The first one proposes to line up all the plurality of data signals with the latest arriving data signal, while the second one is directed to reading the data with different phases of the clock.

It should be noted that, to the best of the inventor's knowledge, neither of the prior art references/products reduces the required Data-clock-alignment delays to the minimum value necessary to improve the conventional techniques mentioned hereinabove.

OBJECTS AND SUMMARY OF THE DISCLOSURE

It is therefore the object of the present invention to provide a method which would allow synchronizing data transmitted in parallel via N channels, thereby minimizing degradation of valid data portions (data eye).

Other objects of the invention will become apparent as the description of the invention proceeds.

The present invention specifically deals with the first part of the conventional solution mentioned in the background, namely with Data-clock-alignment, and proposes to perform it separately and independently from the word alignment, thereby alleviating the problem of synchronizing and making it less harmful to the data eye (valid data portion).

To achieve the above object, there is provided a method for synchronizing binary data transmitted in parallel via N paths/channels between a transmitter and a receiver, wherein the method comprises performing, at the receiver's side:

a data-clock-alignment (i.e., aligning centers of valid data portions such as eye centers, with the clock edge), for said data in said N channels, wherein the operation of data-clock-alignment being performed by selecting an optimal reference channel, leaving it intact (i.e. refrain from adding a delay to that channel) and adding an appropriate delay to each of the remaining N−1 channels (out of these N channels) until their respective centers of valid data (centers of valid data portions) are aligned to each other, and associating clock edges with the centers of the valid data portions, wherein the alignment of the centers of the valid data portions ("valid data centers") is performed regardless of whether binary word alignment has been simultaneously achieved or not (e.g., whether the origin of the N data eyes sampled by the receiver clock edge is from the same transmitter clock edge), and wherein the optimal reference channel allows aligning of valid data centers of all the channels while adding a minimal delay to a worst channel from among the N−1 remaining channels, wherein the worst channel carries valid data portions which are maximally shifted from those of the optimal reference channel (and thus requires the highest delay with respect to the reference channel to which it would be aligned to).

In other words, an optimal reference channel is a channel characterized by having the minimal "worst case delay" value when compared with the other channels belonging to the N channels.

According to another embodiment, the method further comprises a step of binary word alignment, performed independently (and preferably separately) from the operation of Data-clock-alignment. Carrying out this step of word alignment may ensure at the receiver, simultaneous receipt of N bits of a data word being simultaneously transmitted by the transmitter over the N channels. In other words, carrying out this step may preferably ensure that a group of N valid data portions is aligned and synchronized by one receiver clock edge belonging to one data word transmitted over the N channels by the same transceiver clock edge.

More specifically, in order to decide which path is the optimal reference path/channel, the method may comprise performing the following operations for each specific channel:

selecting one of the N channels provided, as a reference channel;

calculating for said selected channel its delay from each of the other remaining N−1 channels;

determining a worst channel shift for said selected channel, wherein the worst channel shift being the longest delay from among the N−1 calculated delays;

comparing values of the worst channel shift calculated for the selected channel with the worst channel shift calculated for at least one of the other N−1 remaining channels; and based on said comparison, determining said selected channel to be an the optimal reference channel if its worst channel shift is less than the worst channel shift of any of the at least one of the other N−1 remaining channels.

As will be appreciated by those skilled in the art, the present invention proposes a counter-intuitive, non-obvious approach where data paths are not aligned towards the most delayed data path, neither towards the clock (as was done in some the prior art solutions. Instead, an optimal reference path as suggested by the inventor is one that allows applying minimized delays for the required alignment.

Generally, not all data channels associated with the interface would arrive with the same data eye width at the RX side before any delay is applied. The proposed method may be further refined by taking into consideration which of the channels arrives with the narrowest valid data portion (data eye) while choosing the reference channel, to make sure that less jitter is added to the "bad" channel having an already narrowed data eye. For example, a "bad" channel may be selected as the optimal reference channel in order to refrain from adding a further delay to this channel, if that channel is indeed sufficiently close to the optimal reference channel (i.e., does not contradict the general approach as proposed by the present invention).

Alternatively or in addition to the above, the optimal reference channel may be selected so that the "bad" channel would require a minimized delay (as small delay as possible) with respect to the optimal one.

According to another embodiment the step of selecting one of the N channels provided as the reference channel, comprises selecting a channel having the narrowest valid data portion.

According to other aspects there are provided a system for aligning data transmitted in parallel via a number (N) of data paths, and a software product responsible for operating the system according to the proposed method.

Thus, there is provided a system for synchronizing binary data transmitted in parallel via N channels between a transmitter and a receiver, the system comprising:

a processing unit PU comprising: a memory, delay regulation means for each channel and a clock generator (e.g. for use at the receiver's side) for performing data-clock-alignment for the data in said N channels, by selecting an optimal reference channel to which no delay will be added, adding an appropriate delay to each of the remaining N−1 channels out of said N channels, until their respective centers of valid data portions (the eyes' centers) are aligned to each other, and associating clock edges with the centers of the valid data portions (the data eyes), wherein the alignment of the data eye centers is performed irrespective of whether a Binary-word-alignment is being simultaneously achieved or not, and wherein the PU is operative to select an optimal reference channel from among the N channels, so that the selected reference channel would allow aligning data eye centers of all the channels while adding the minimal necessary delay to a worst channel from among the N−1 remaining channels, wherein the worst channel is a channel that carries valid data portions (data eyes) that are maximally shifted from those of the optimal reference channel.

The present invention may be implemented by hardware and/or software means installed at the receiver side. Thus, there is provided a computer readable medium storing a computer program for performing a set of instructions to be executed by one or more computer processors, the computer program is adapted to perform the method provided by the present invention (for example, at a processing unit installed at the receiving node). The software product may be installed at the receiver side of the N transmission lines.

The invention will be described in more details as the description proceeds.

BRIEF DESCRIPTION OF THE DRAWINGS

The invention will be further described and illustrated with the aid of the following non-limiting drawings, in which:

FIGS. 4a and 4b can also be regarded as a virtual sub-step of selecting the optimal reference channel, according to the invention;

DETAILED DESCRIPTION OF THE PREFERRED EMBODIMENTS

Figure 1:
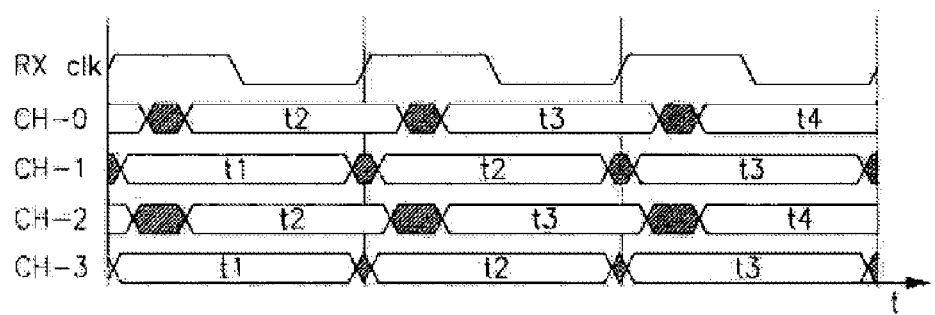
FIG. 1 illustrates an exemplary case of data arriving at the receiver side via N data paths and not being aligned.
Figure 2:
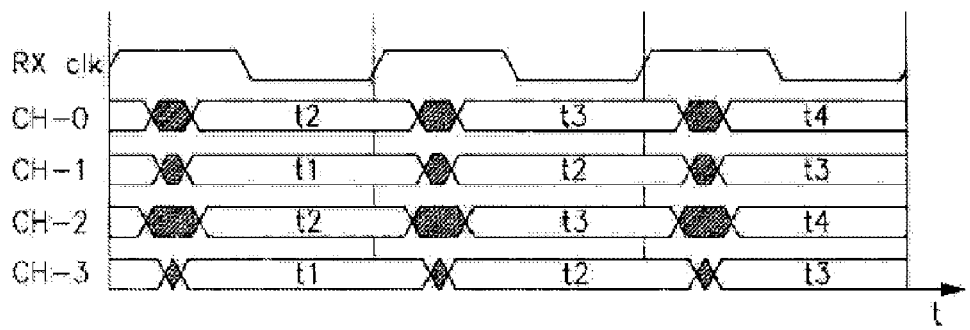
FIG. 2 illustrates another exemplary case when data eyes centers transmitted in parallel are aligned to each other but not synchronized to the same clock cycle.

FIGS. 1 and 2 are discussed under the Background section of the description.

As already described, no delay would be applied to a channel selected as the reference channel, while for other channels, delays are applied in order to align them to the reference channel.

The alignment of these other channels to the reference channel does not necessarily imply aligning data to the same clock cycle. The clock cycle alignment may be further performed separately, by implementing a word alignment technique (For Xilinx V-6 FPGA for example, it would be the bit-slip function in the ISERDES).

Figure 3:
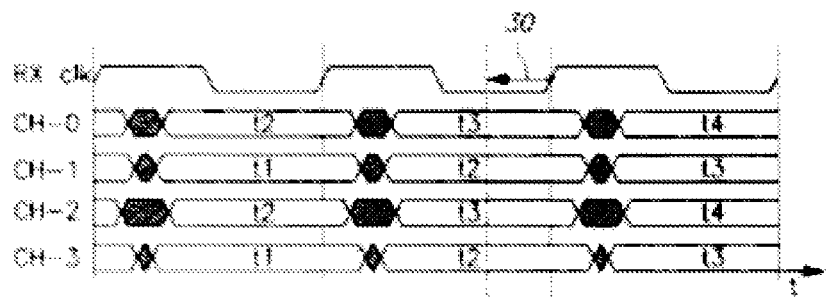
FIG. 3 demonstrates a case where the sampling clock may be shifted towards the center of data (or alternatively, the data may be shifted towards the clock)

FIG. 3 shows another embodiment of the method provided, namely that the sampling clock is to be shifted (see arrow 30) towards the center of a valid data eye of the channels. (For example, in Xilinx V-6 FPGA, it can be done using the phase shift capability of the MMCM). An alternative embodiment could be delaying the data towards the clock, but the latter option is less advantageous since one would prefer to achieve minimal delays.

Figure 4A:
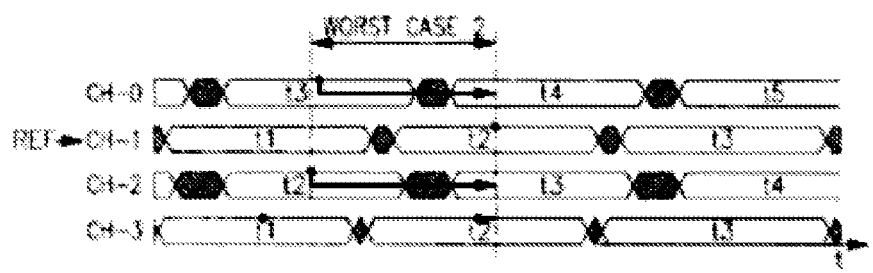
FIGS. 4a and 4b show a way of selecting a reference channel/path for aligning data eyes associated with other channels to the reference channel, using delays.

FIG. 4a shows an embodiment of a method for selecting a reference channel. In this drawing, the slowest channel is Channel 1 (CH-1). Thus, the intuitive choice would be to refrain from adding any delays to Channel 1, i.e., to select it as a reference channel, and to add delays to other channels in order to align them to Channel 1. CH 1 is marked as REF in FIG. 4a.

Now, when the reference channel in FIG. 4a is Channel 1, the channel which would require the addition of the highest delay is Channel 2. In this case, the worst case channel will be Channel 2, and the delay of Channel 2 with respect to the reference channel, Channel 1, is referred to as the worst case delay for this specific reference channel. This is referred to in FIG. 4a as the "worst case 2" delay for the reference CH-1. The delay is measured between centers of the valid data portions (the centers are marked by respective black points). The required delays are marked as thick black arrows extending between centers of the valid data portions, on the corresponding channels.

Figure 4B:
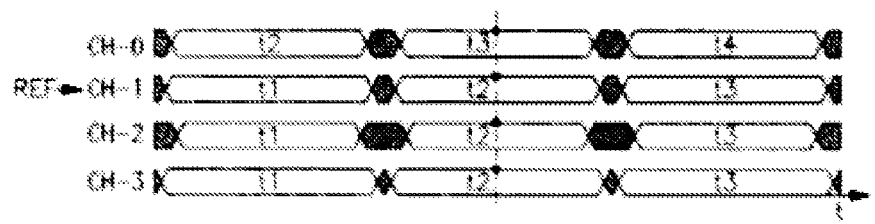

FIG. 4b illustrates the result of Data-Clock-alignment if performed by adding delays to the remaining channels so as to bring them in line with the reference channel CH-1.

In addition, word alignment can be performed, if required, as in this example. Although such Data clock alignment may result also in word alignment.

According to an embodiment of the invention FIG. 4a may be considered as a virtual sub-step of the method provided. The proposed method comprises checking every specific channel in the N-lines' transmission, in order to establish which delays would be required for other channels if a specific channel is selected as a reference channel. Therefore, FIG. 4a may be understood as an illustration of how Channel 1 is checked as a candidate for the optimal reference channel. It should be noted, however, that the worst case delay cannot be more than one clock cycle.

During the process of establishing the optimal reference channel, for each selection, i.e. for each channel being considered as a reference channel, there might be required a different delay for the "worst case channel", since, as explained hereinabove, the term "worst case channel" relates to the channel that would require the maximum delay in order to have it aligned with a specific channel being considered as a reference channel in the process of selecting the optimal reference channel, i.e. a "worst case channel" being one that needs to be delayed/shifted more than any of the other channels being aligned with the reference channel.

The purpose of the method provided is to determine which channel would require minimal delays for alignment of the other channels therewith, and as would be understood by any person skilled in the art, for any channel considered as a reference channel there will be a worst-case-delay associated therewith. The channel with the smallest worst-case-delay may be selected as the best/optimal reference channel. In other words, if we choose the right channel, the delay applied to the worst case channel would be minimal among the possible delays associated with the other choices being considered in the process.

Choosing the right channel as the reference channel will entail the best performance from the point of less data eye distortion.

Figure 5A:
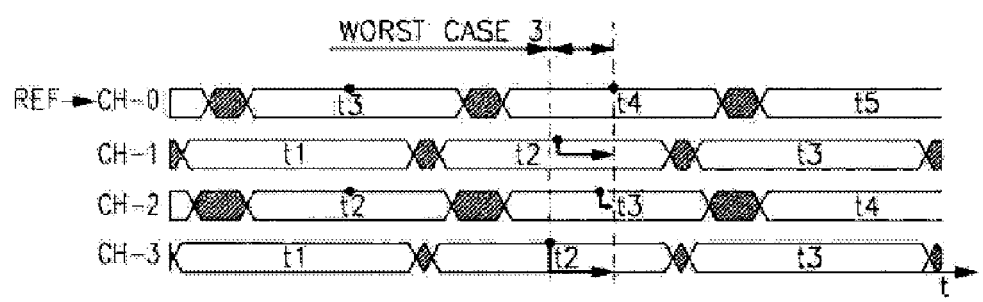
FIGS. 5a, 5b present schematically a proposed approach to checking N transmission channels in order to establish the "worst case delay" with respect to a specific channel (which may then be used while selecting the optimal reference channel)
Figure 5B:
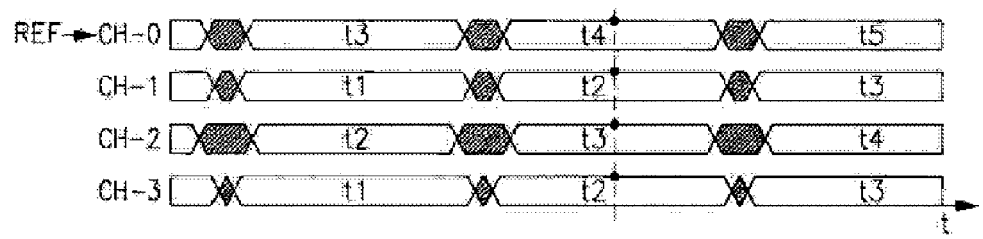

Let us now consider an example illustrating the next step of an embodiment of the method provided illustrated in FIGS. 5a and 5b.

FIG. 5a illustrates in a schematic way and embodiment of making another, judicious choice of a reference channel. FIG. 5a shows the same "wave" position as in FIG. 4; however, the alignment in FIG. 5b is done with respect to another reference channel, which is checked and then selected according to the proposed optimized embodiment. FIGS. 5a and 5b serve as an example of how the proposed method is used to find the optimal reference channel, and then to achieve better results (from the perspective of added delays) than if the selection demonstrated in FIG. 4a is made.

Suppose that we consider every channel to be a candidate to be selected as a reference channel then we would reach the following conclusion which can be visually seen in FIG. 5a. If one selects CH-1 as the reference channel, the worst case channel is CH-2 (FIG. 4a), whereas if one selects CH-0 as the reference channel (REF), the worst case channel would be CH-3 (FIG. 5a).

Keeping in mind that the delays are measured between centers (marked by black points) of two valid data portions in two different channels, the delays are shown as black thick arrows there-between.

As may be observed from FIG. 4a and FIG. 5a, CH-0 is a better (optimal) candidate to be a reference channel. Thus, if one were to choose CH-0 as the reference channel, the worst case would be aligning CH-3 to CH-0, which is much better (i.e. requires a smaller delay) than aligning CH-2 to CH-1 (as illustrated in FIG. 4a), in other words, worst case 2 delay>>worst case 3 delay.

The physical meaning is that among the two reference channels discussed above, the worst case of delaying channel 3 is smaller than the worst case of delaying channel 2. It shows that the proposed method enables its user to find a better solution than a method of selecting the reference channel based on the delays and subsequent jitter.

It may be seen, that while checking for other "reference" channels in the example illustrated in FIG. 5a, any worst case delay is higher than the worst case 3 delay for CH-0 being REF. Therefore, Channel 0 should be determined as the optimal reference channel for the example illustrated by FIG. 5.

Following the performing of the data clock alignment according to the method discussed in connection with FIG. 5a, the pattern illustrated in FIG. 5b is obtained when the channels remain non-word-aligned. However, as was previously discussed, according to another embodiment of the method provided, one may carry out this alignment by implementing for example standard tools that are know in the art per se, without paying a penalty of a substantial delay that adds more unnecessary jitter.

In practice, the various embodiments described above may be summarized as follows:
  Choosing a channel to be the optimal reference channel and refrain from applying delay to the chosen channel (all channels in a group of paths are checked as possible candidates for "the optimal reference channel", followed by comparing the worst case channel delays of each candidate, with others already established. The minimal worst case indicates the channel to be selected as the optimal reference channel;
  Applying delays to the rest of channels until centers of valid data portions (data eye centers) of all channels are aligned.
  Preferably, shifting the sampling clock towards the center of the data (see FIG. 3). If clock phase shifting is not possible, all channels may be shifted towards the clock edge by adding more delay (however, this will add further jitter).
  Fixing the clock cycles of difference between the channels (i.e. the word alignment, which can be performed according to methods known in the art).

Now, when comparing the above FIGS. 4 and 5, one may note the following practical example demonstrating advantages of the proposed method.

When installing at the receiver interface a Xilinx FPGA and using the parameters obtainable from the Xilinx document DS152, each delay increment will be of a fixed value of ~78 ps.

Applying each delay portion increment will narrow the eye by 18 ps (when the HIGH_PERFORMANCE mode is set to FALSE).

Considering FIG. 4, let us assume a 800 Mhz data rate and that, due to distortion, the valid data eye is 500 ps. Also, let us assume that the distance "worst-case-2" is 1100 ps and "worst-case-3" (illustrated in FIG. 5a) is 400 ps.

Had we chosen CH-1 to be the reference channel, we would have been required to use 1100/78~=14 delays. This would have narrowed the valid data width of CH-2 by 14×18=252 ps, namely from 500 ps to 248 ps, which results in a 50% degradation (all other channels would need smaller delays).

On the other hand, using the suggested method and choosing CH-0 as the optimal reference channel, one needs only 400/78~=5 delays, which in turn will narrow the valid data width of CH-3 by 5×18=90 ps (from 500 ps to 410 ps), resulting in only 18% degradation (all other channels need shorter delays and thus will suffer less).

At higher frequencies (or at more severe jitter conditions) the situation might be such that, without using the method proposed herein, there might be no valid eye left at all, or if left, it will not suffice for performing dynamic alignment (i.e., to compensate for supply voltage, and temperature variations, etc.).

Another alignment method known in the art, has been described in the Xilinx® document (XAPP860 (v1.1) of Jul. 17, 2008) by which one needs to align each channel separately to the clock. This procedure measures one full data eye (in terms of 78 ps delay taps) and then returns to the center of the data eye.

However, when applying this method, a worst case should be considered where the process needs to go through two (!) valid data eye widths plus the transition width between the two data eyes before it may return to the eye center (i.e. going through one eye, finding first transition and continuing to generate delays while finding the second transition).

On the other hand, the worst case for the method proposed by an embodiment of the present invention will never exceed a delay of one clock cycle. Therefore, the necessary delays and the data distortion in the method provided will be much smaller also in comparison with the above-mentioned prior art alignment method.

Figure 6:
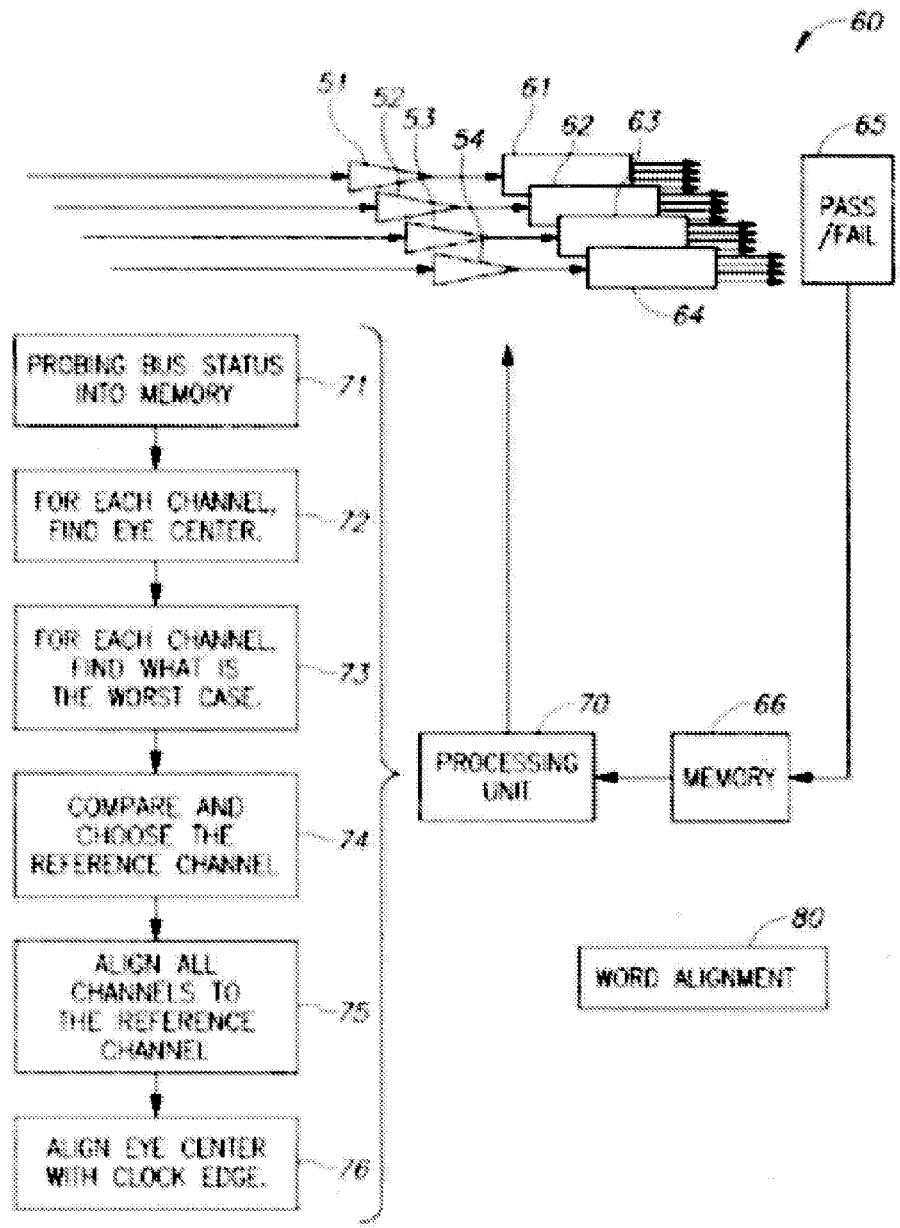
FIG. 6 illustrates schematically a block diagram of a Processing Unit at the receiver's side, comprising HW and/or SW means for performing operations of the method provided, thereby obtaining controlled synchronization of data being transmitted in parallel.

FIG. 6 shows a schematic diagram of a system 60 comprising a processing unit PU 70 (for example, a hardware controller, or a hardware/software block) adapted to carry out the proposed method based on information collected from N transmission lines/paths (four lines are shown).

Let us start by considering the behavior of each of the transmission lines. Each line comprises a serializer (not shown in this figure) and a receiver deserializer (61, 62, 63, 64) with a controlled delay unit (shown by a triangle 51, 52, 53, 54) on its serial side.

Suppose that the transmitting side (not shown, located at the left side end of the path) sends a pattern of 1101 on the serializer parallel side (not shown), so as to send it then serially over a specific transmission line.

Before the channel is aligned, the receiver serial clock might sample at data transitions (the gray portion of transmission, see FIGS. 1-3), therefore the deserializer's (61, as well as 62, 63, 64) parallel side can output any one of 16 possible patterns of the four binary positions.

After aligning the serial side receiving clock into a valid eye region (the light portion of transmission, see FIGS. 1-3) the pattern at the deserializer's parallel side will be one out of four possible combinations: 1101, 1110, 0111 or 1011.

Let us designate each of these four patterns as a "pass" pattern, whereas all other 12 options as "fail" patterns.

The pass/fail block 65 looks for the transmitted pattern. It checks for each channel if it is designated as "pass" or "fail" and registers the path status in memory 66 ('1' for pass, '0' for fail).

After one delay portion is applied to a suitable delay unit 51, 52, 53 or 54, (clock phase shift portions may be used instead of adding delays to achieve the same purpose, gathering pass/fail information about the channels), block 65 checks again the "pass" or "fail" designations and writes it again to the memory, and then the PU assigns an order to the delay unit (51, ... 54) to enable adding more delay, applying another delay portion, and so on.

Finally, the status from the pass/fail is written to the memory, followed by the start of the process to determine the center of a data eye.

After the pass/fail block 65 finishes gathering the information, the memory picture for one channel may look like the following:

0001111111111000111111111111000

If, for example, each delay portion is of 100 ps, we have a valid eye of 11×100=1100 ps wide and the eye center is therefore found after 8 delay portions. The same result may be achieved by phase shifting the clock for 100 ps, writing pass/fail status, applying one more 100 ps shift, and so on.

In this example, the PU 70 retrieves information stored at the memory 66, analyses this information and concludes after the number of delays required before it finds a center. In this example the PU 70 would have concluded that 8 delay portions are required.

After registering the status of all the lines in the memory, the processing unit PU starts applying the proposed method, using the collected probed bus status which is already stored at the memory.

The processing unit PU may be schematically illustrated as comprising sub-units (shown as boxes 71-76 to the left of block 70) for carrying out the remaining operations (mentioned as steps in the boxes of the block-diagram of PU 70). Upon data clock alignment (aligning of the eye center with clock edge), the processing unit PU (or an additional separate unit 80) may implement the word alignment procedure to the received data.

In the present example, after the word alignment has been carried out, one should obtain a unique pattern, namely: the transmitted pattern 1101 transmitted serially on each channel, bit by bit: 1, 1, 0, 1, which is then forwarded to the deserializer as a word "1101". After carrying out this operation for each one of the channels, it is expected that the receiver's clock will sample simultaneously, on all the channels, the data transmitted at the same clock edge from the transmitter.

Although the invention has been described with reference to specific examples, it should be appreciated that other versions of the method and additional embodiments of the system could be proposed and should be considered part of the invention whenever encompassed by the claims which follow.

The invention claimed is:

1. A method for synchronizing binary data transmitted in parallel in a communication network via N communication channels extending between a transmitter and a receiver, the method comprises;
   at the receiver, carrying out a data-clock-alignment for data conveyed along said N communication channels, wherein N is an integer being equal to or greater than 2, by selecting from among said N communication channels, an optimal reference communication channel having a minimal delay value with respect to the remaining N−1 communication channels and to which no delay will be added, and adding an appropriate delay to each of the remaining N−1 communication channels out of said N communication channels thereby ensuring that their respective centers of valid data portions are aligned with each other, and associating clock edges with the respective centers of the valid data portions,
   wherein the alignment of the centers of the valid data portions is performed separately from respective binary word alignment and
   wherein the optimal reference communication channel allows aligning centers of valid data of all the channels, while adding a minimal delay to a worst communication channel from among the N−1 remaining communication channels, wherein the worst communication channel carries valid data portions which are maximally shifted from those of the optimal reference communication channel.

2. The method according to claim 1, further comprising a step of performing a word alignment independently from the step of data-clock-alignment, so as to ensure that a group of N valid data portions aligned and synchronized by one receiver clock edge belongs to one data word transmitted over said N communication channels by the same transceiver clock edge.

3. The method according to claim 1, wherein the selection of an optimal reference communication channel to which no delay will be added comprises the steps of:
   selecting one of the N communication channels provided;
   calculating for said selected communication channel its delay with respect to each of the other remaining N−1 communication channels;
   determining a worst communication channel shift for said selected communication channel, wherein the worst communication channel shift being the longest delay from among the N−1 calculated delays;
   comparing values of the worst communication channel shift calculated for the selected communication channel, with the worst communication channel shift calculated for at least one of the other N−1 remaining communication channels; and
   based on said comparison, determining said selected communication channel to be an the optimal reference communication channel if its worst communication channel shift is less than the worst communication channel shift of any of the at least one of the other N−1 remaining communication channels.

4. The method according to claim 3, wherein the step of selecting one of the N communication channels provided as a reference communication channel comprises selecting a communication channel having the narrowest valid data portion.

5. A computer readable non-transitory medium storing a computer program for performing a set of instructions to be executed by one or more computer processors, the computer program is configured to perform the method of claim 1.

6. A communication system for synchronizing binary data transmitted in parallel via N communication channels between a transmitter and a receiver, the system comprising:
   a processing unit comprising: a memory, a delay regulator associated with each communication channel, and a clock generator, wherein the processing unit is configured to:
   perform data-clock-alignment for the data in said N communication channels, by selecting an optimal reference communication channel to which no delay will be added,
   add an appropriate delay to each of the remaining N−1 communication channels out of said N communication channels, thereby ensuring that their respective centers of valid data portions are aligned to each other, and
   associate clock edges with the centers of the valid data portions, wherein the alignment of said centers is performed separately from respective binary-word-alignment, and wherein the processing unit is operative to select an optimal reference communication channel from among the N communication channels, wherein N is an integer being equal to or greater than 2, by selecting from among said N communication channels, an optimal reference communication channel having a minimal delay value with respect to the remaining N−1 communication channels, which would allow aligning data eye centers of all the communication channels while adding a minimal necessary delay to a worst communication channel from among the N−1 remaining communication channels, wherein the worst communication channel is a communication channel that carries valid data portions that are maximally shifted from those of the optimal reference communication channel.

* * * * *